US011111766B2

(12) United States Patent
Brannon et al.

(10) Patent No.: US 11,111,766 B2
(45) Date of Patent: *Sep. 7, 2021

(54) METHODS OF IMPROVING HYDRAULIC FRACTURE NETWORK

(71) Applicant: Baker Hughes Holdings LLC, Houston, TX (US)

(72) Inventors: Harold Dean Brannon, Magnolia, TX (US); Thomas Ray Starks, II, Spring, TX (US); Scott Gregory Nelson, Edmond, OK (US); Charles Elmer Bell, Rockwall, TX (US); Tom N. Royce, San Antonio, TX (US); D. V. Satyanarayana Gupta, The Woodlands, TX (US); Jimie Devon Lemons, Houston, TX (US); Curtis David Huff, Edmond, OK (US); John Gottschling, Canonsburg, PA (US); Angel F. Gonzalez, Houston, TX (US)

(73) Assignee: Baker Hughes Holdings LLC, Houston, TX (US)

(*) Notice: Subject to any disclaimer, the term of this patent is extended or adjusted under 35 U.S.C. 154(b) by 70 days.

This patent is subject to a terminal disclaimer.

(21) Appl. No.: 15/919,586

(22) Filed: Mar. 13, 2018

(65) Prior Publication Data
US 2018/0202276 A1     Jul. 19, 2018

Related U.S. Application Data

(63) Continuation-in-part of application No. 14/461,123, filed on Aug. 15, 2014, now Pat. No. 10,041,327,
(Continued)

(51) Int. Cl.
*E21B 43/26* (2006.01)
*E21B 43/243* (2006.01)
(Continued)

(52) U.S. Cl.
CPC .............. *E21B 43/26* (2013.01); *C09K 8/508* (2013.01); *C09K 8/516* (2013.01); *C09K 8/68* (2013.01);
(Continued)

(58) Field of Classification Search
None
See application file for complete search history.

(56) References Cited

U.S. PATENT DOCUMENTS 2,596,843 A   5/1952   Farris
2,735,269 A   2/1956   Carpenter
(Continued)

FOREIGN PATENT DOCUMENTS

CA   2329834 A1   6/2002
EP   0308257 A2   9/1989
(Continued)

OTHER PUBLICATIONS

Nolte, "Fracture Design Considerations Based on Pressure Analysis" SPE 10911 (1982).*
(Continued)

*Primary Examiner* — Charles R Nold
(74) *Attorney, Agent, or Firm* — John Wilson Jones; . Jones Delflache LLP (57) ABSTRACT

The complexity of a fracture network may be enhanced during a hydraulic fracturing operation by monitoring operational parameters of the fracturing job and altering stress conditions in the well in response to the monitoring of the operational parameters. The operational parameters monitored may include the injection rate of the pumped fluid, the density of the pumped fluid or the bottomhole pressure of the well after the fluid is pumped. The method provides an increase to the stimulated reservoir volume (SRV).

11 Claims, 1 Drawing Sheet

Related U.S. Application Data which is a continuation-in-part of application No. 13/928,006, filed on Jun. 26, 2013, now Pat. No. 9,919,966, application No. 15/919,586, which is a continuation-in-part of application No. 13/927,304, filed on Jun. 26, 2013, now Pat. No. 9,920,607.

(60) Provisional application No. 61/664,640, filed on Jun. 26, 2012, provisional application No. 61/664,595, filed on Jun. 26, 2012.

(51) Int. Cl.
*E21B 43/267* (2006.01)
*E21B 33/138* (2006.01)
*C09K 8/68* (2006.01)
*E21B 47/06* (2012.01)
*E21B 47/00* (2012.01)
*C09K 8/508* (2006.01)
*C09K 8/516* (2006.01)

(52) U.S. Cl.
CPC ............ *E21B 43/267* (2013.01); *E21B 47/00* (2013.01); *E21B 47/06* (2013.01); *E21B 33/138* (2013.01)

(56) References Cited

U.S. PATENT DOCUMENTS

| | | |
|---|---|---|
| 2,966,457 A | 12/1960 | Starmann et al. |
| 3,089,542 A | 5/1963 | Kolodny |
| 3,127,937 A | 4/1964 | McGuire, Jr. et al. |
| 3,149,673 A | 9/1964 | Pennington |
| 3,149,674 A | 9/1964 | Schutze et al. |
| 3,151,678 A | 10/1964 | Hanson et al. |
| 3,159,217 A | 12/1964 | Hanson |
| 3,175,615 A | 3/1965 | East |
| 3,249,158 A | 5/1966 | Kieschnick, Jr. et al. |
| 3,254,717 A | 6/1966 | Huitt et al. |
| 3,266,573 A | 8/1966 | Rixe |
| 3,335,796 A | 8/1967 | Parker, Jr. |
| 3,335,797 A | 8/1967 | Braunlich, Jr. |
| 3,372,752 A | 3/1968 | Prater |
| 3,399,727 A | 9/1968 | Graham et al. |
| 3,480,084 A * | 11/1969 | Eilers .......... E21B 43/261 166/282 |
| 3,492,147 A | 1/1970 | Young |
| 3,497,008 A | 2/1970 | Grham et al. |
| 3,659,651 A | 5/1972 | Graham |
| 3,709,300 A | 1/1973 | Pye |
| 3,888,311 A | 6/1975 | Cooke |
| 3,929,191 A | 12/1975 | Graham et al. |
| 3,937,283 A | 2/1976 | Blauer et al. |
| 3,954,142 A | 5/1976 | Broaddus et al. |
| 4,051,900 A | 10/1977 | Hankins |
| 4,074,760 A | 2/1978 | Copeland et al. |
| 4,078,609 A | 3/1978 | Pavlich |
| 4,078,610 A | 3/1978 | Arnold |
| 4,195,010 A | 3/1980 | Russell et al. |
| 4,216,829 A | 8/1980 | Murphey |
| 4,283,089 A | 8/1981 | Mazza et al. |
| 4,421,167 A | 12/1983 | Erbstoesser et al. |
| 4,439,489 A | 3/1984 | Johnson |
| 4,444,264 A | 4/1984 | Dill |
| 4,462,466 A | 7/1984 | Kachnik |
| 4,493,875 A | 1/1985 | Beck et al. |
| 4,501,672 A | 2/1985 | Connell et al. |
| 4,506,734 A | 3/1985 | Nolte |
| 4,509,598 A | 4/1985 | Earl et al. |
| 4,502,967 A | 5/1985 | Conway |
| 4,547,468 A | 10/1985 | Jones et al. |
| 4,566,539 A | 1/1986 | Perlman |
| 4,585,064 A | 4/1986 | Graham et al. |
| 4,632,876 A | 12/1986 | Laird et al. |
| 4,654,266 A | 3/1987 | Kachnik |
| 4,680,230 A | 7/1987 | Gibb et al. |
| 4,717,594 A | 1/1988 | Graham et al. |
| 4,733,739 A | 3/1988 | Copeland |
| 4,796,701 A | 1/1989 | Hudson et al. |
| 4,829,100 A | 5/1989 | Murphey et al. |
| 4,830,794 A | 5/1989 | Edgley et al. |
| 4,840,729 A | 6/1989 | Levine |
| 4,850,430 A | 7/1989 | Copeland et al. |
| 4,869,960 A | 9/1989 | Gibb et al. |
| 4,875,525 A | 10/1989 | Manna |
| 4,887,670 A | 12/1989 | Lord et al. |
| 4,888,240 A | 12/1989 | Graham et al. |
| 4,895,207 A | 1/1990 | Friedman et al. |
| 4,921,820 A | 5/1990 | Rumpf et al. |
| 4,921,821 A | 5/1990 | Rumpf et al. |
| 4,923,714 A | 5/1990 | Gibb et al. |
| 4,969,523 A | 11/1990 | Martin et al. |
| 5,014,788 A | 5/1991 | Puri et al. |
| 5,069,283 A | 12/1991 | MacK |
| 5,074,359 A | 12/1991 | Schmidt |
| 5,103,905 A | 4/1992 | Brannon et al. |
| 5,175,133 A | 12/1992 | Smith et al. |
| 5,240,654 A | 8/1993 | Smith et al. |
| 5,246,602 A | 9/1993 | Forrest |
| 5,305,832 A | 4/1994 | Gupta et al. |
| 5,325,921 A | 7/1994 | Johnson et al. |
| 5,330,005 A | 7/1994 | Card et al. |
| 5,333,689 A | 8/1994 | Jones et al. |
| 5,381,864 A | 1/1995 | Nguyen et al. |
| 5,390,741 A | 2/1995 | Payton et al. |
| 5,417,286 A | 5/1995 | Palmer et al. |
| 5,422,183 A | 6/1995 | Sinclair et al. |
| 5,425,421 A | 6/1995 | Coleman et al. |
| 5,435,391 A | 7/1995 | Jones |
| 5,439,055 A | 8/1995 | Card et al. |
| 5,443,633 A | 8/1995 | Hirsbrunner et al. |
| 5,492,178 A | 2/1996 | Nguyen |
| 5,501,273 A | 3/1996 | Puri |
| 5,501,275 A | 3/1996 | Card et al. |
| 5,515,920 A | 5/1996 | Luk |
| 5,531,274 A | 7/1996 | Bienvenu, Jr. |
| 5,547,506 A | 8/1996 | Rae et al. |
| 5,551,344 A | 9/1996 | Couet et al. |
| 5,582,249 A | 12/1996 | Caveny et al. |
| 5,582,250 A | 12/1996 | Constien |
| 5,597,784 A | 1/1997 | Sinclair et al. |
| 5,604,184 A | 2/1997 | Ellis et al. |
| 5,699,860 A | 12/1997 | Grundmann |
| 5,799,734 A | 9/1998 | Norman et al. |
| 5,837,656 A | 11/1998 | Sinclair |
| 5,850,875 A | 12/1998 | McCulloch et al. |
| 5,881,813 A | 3/1999 | Brannon et al. |
| 5,908,073 A | 6/1999 | Nguyen et al. |
| 5,916,933 A | 6/1999 | Johnson et al. |
| 5,921,317 A | 7/1999 | Dewprashed et al. |
| 5,924,488 A | 7/1999 | Nguyen et al. |
| 5,948,734 A | 9/1999 | Sinclair |
| 5,950,727 A | 9/1999 | Irani |
| 5,955,144 A | 9/1999 | Sinclair et al. |
| 5,960,878 A | 10/1999 | Nguyen et al. |
| 5,964,289 A | 10/1999 | Hill |
| 5,964,290 A | 10/1999 | Riese et al. |
| 5,964,291 A | 10/1999 | Bourne et al. |
| 6,047,772 A | 4/2000 | Weaver et al. |
| 6,059,034 A | 5/2000 | Rickards et al. |
| 6,070,666 A | 6/2000 | Montgomery |
| 6,079,492 A | 6/2000 | Hoogteejling et al. |
| 6,114,410 A | 9/2000 | Betzold |
| 6,116,342 A | 9/2000 | Clark et al. |
| 6,138,760 A | 10/2000 | Lopez et al. |
| 6,169,058 B1 | 1/2001 | Le et al. |
| 6,172,011 B1 | 1/2001 | Card et al. |
| 6,194,355 B1 | 2/2001 | Jarrett et al. |
| 6,209,643 B1 | 4/2001 | Nguyen et al. |
| 6,211,120 B1 | 4/2001 | Welch et al. |
| 6,248,838 B1 | 6/2001 | Albright |
| 6,311,773 B1 | 11/2001 | Todd et al. |
| 6,315,041 B1 | 11/2001 | Carlisle et al. |
| 6,328,105 B1 | 12/2001 | Betzold |

(56) References Cited

U.S. PATENT DOCUMENTS

| | | |
|---|---|---|
| 6,330,916 B1 | 12/2001 | Rickards et al. |
| 6,348,629 B1 | 2/2002 | Albright |
| 6,364,018 B1 | 4/2002 | Brannon et al. |
| 6,367,548 B1 | 4/2002 | Purvis et al. |
| 6,372,678 B1 | 4/2002 | Youngman et al. |
| 6,399,546 B1 | 6/2002 | Chang et al. |
| 6,406,789 B1 | 6/2002 | McDaniel et al. |
| 6,412,559 B1 | 7/2002 | Gunter et al. |
| 6,439,309 B1 | 8/2002 | Matherly et al. |
| 6,439,310 B1 | 8/2002 | Scott et al. |
| 6,451,953 B1 | 9/2002 | Albright |
| 6,491,099 B1 | 12/2002 | Di Lullo Arias et al. |
| 6,503,676 B2 | 1/2003 | Yamashita et al. |
| 6,508,305 B1 | 1/2003 | Brannon et al. |
| 6,528,157 B1 | 3/2003 | McDaniel et al. |
| 6,541,579 B2 | 4/2003 | Albright |
| 6,579,947 B2 | 6/2003 | Heitz et al. |
| 6,582,819 B2 | 6/2003 | McDaniel et al. |
| 6,632,527 B1 | 10/2003 | McDaniel |
| 6,640,897 B1 | 11/2003 | Misselbrook et al. |
| 6,667,261 B1 | 12/2003 | Anshits et al. |
| 6,705,400 B1 | 3/2004 | Nguyen et al. |
| 6,725,931 B2 | 4/2004 | Nguyen et al. |
| 6,742,590 B1 | 6/2004 | Nguyen |
| 6,749,025 B1 | 6/2004 | Brannon et al. |
| 6,766,817 B2 | 7/2004 | da Silva |
| 6,776,235 B1 | 7/2004 | England |
| 6,772,838 B2 | 8/2004 | Dawson et al. |
| 6,830,105 B2 | 12/2004 | Theising et al. |
| 6,892,813 B2 | 4/2005 | Nguyen et al. |
| 7,001,872 B2 | 2/2006 | Pyecroft et al. |
| 7,036,590 B2 | 5/2006 | Harris |
| 7,036,591 B2 | 5/2006 | Canan et al. |
| 7,036,597 B2 | 5/2006 | O'Brien et al. |
| 7,044,220 B2 | 5/2006 | Nguyen et al. |
| 7,066,258 B2 | 6/2006 | Justus et al. |
| 7,086,460 B2 | 8/2006 | Nguyen et al. |
| 7,153,575 B2 | 12/2006 | Anderson et al. |
| 7,207,386 B2 | 4/2007 | Brannon et al. |
| 7,210,528 B1 | 5/2007 | Brannon et al. |
| 7,213,651 B2 | 5/2007 | Brannon et al. |
| 7,226,971 B2 | 6/2007 | Ramesh et al. |
| 7,270,879 B2 | 9/2007 | McCrary |
| 7,271,133 B2 | 9/2007 | Weaver et al. |
| 7,303,018 B2 | 12/2007 | Cawiezel et al. |
| 7,350,572 B2 | 4/2008 | Fredd et al. |
| 7,361,693 B2 | 4/2008 | Albright et al. |
| 7,426,961 B2 | 9/2008 | Stephenson et al. |
| 7,472,751 B2 | 1/2009 | Brannon et al. |
| 7,510,009 B2 | 3/2009 | Cawiezel et al. |
| 7,565,929 B2 | 7/2009 | Bustos et al. |
| 7,603,896 B2 | 10/2009 | Kalfayan et al. |
| 7,638,468 B2 | 12/2009 | Gupta |
| 7,669,655 B2 | 3/2010 | Brannon |
| 7,726,399 B2 | 6/2010 | Brannon et al. |
| 7,913,762 B2 | 3/2011 | Wheeler et al. |
| 7,918,277 B2 | 4/2011 | Brannon et al. |
| 7,971,643 B2 | 7/2011 | Brannon et al. |
| 8,061,424 B2 | 11/2011 | Willberg et al. |
| 8,127,850 B2 | 3/2012 | Brannon et al. |
| 8,173,581 B2 | 5/2012 | Huang |
| 8,205,675 B2 | 6/2012 | Brannon et al. |
| 8,408,305 B2 | 4/2013 | Brannon et al. |
| 8,739,878 B2 | 6/2014 | Brannon et al. |
| 8,789,596 B2 | 7/2014 | Curtis et al. |
| 8,936,085 B2 | 1/2015 | Boney et al. |
| 2002/0023752 A1 | 2/2002 | Qu et al. |
| 2002/0048676 A1 | 4/2002 | McDaniel et al. |
| 2003/0050432 A1 | 3/2003 | Ramesh et al. |
| 2003/0102128 A1 | 6/2003 | Dawson et al. |
| 2003/0224165 A1 | 12/2003 | Anderson et al. |
| 2003/0234106 A1 | 12/2003 | Surjaatmadja |
| 2004/0023812 A1 | 2/2004 | England et al. |
| 2004/0023818 A1 | 2/2004 | Nguyen et al. |
| 2004/0040708 A1 | 3/2004 | Stephenson et al. |
| 2004/0072700 A1 | 4/2004 | Gupta et al. |
| 2004/0224165 A1 | 12/2004 | Barron et al. |
| 2004/0244978 A1 | 12/2004 | Shaarpour |
| 2004/0261996 A1 | 12/2004 | Munoz et al. |
| 2005/0016732 A1 | 1/2005 | Brannon et al. |
| 2005/0019574 A1 | 1/2005 | McCrary |
| 2005/0028976 A1 | 2/2005 | Nguyen et al. |
| 2005/0028979 A1 | 2/2005 | Brannon et al. |
| 2005/0034860 A1 | 2/2005 | Lauritzen |
| 2005/0059558 A1 | 3/2005 | Blauch et al. |
| 2005/0089631 A1 | 4/2005 | Nguyen et al. |
| 2005/0130848 A1 | 6/2005 | Todd et al. |
| 2005/0137095 A1 | 6/2005 | Cawiezel et al. |
| 2005/0244641 A1 | 11/2005 | Vincent |
| 2005/0272612 A1 | 12/2005 | Dawson et al. |
| 2005/0274523 A1 | 12/2005 | Wood et al. |
| 2006/0011342 A1 | 1/2006 | Lizak |
| 2006/0042797 A1 | 3/2006 | Fredd et al. |
| 2006/0073980 A1 | 4/2006 | Brannon et al. |
| 2006/0151169 A1 | 7/2006 | Ortiz et al. |
| 2006/0185848 A1 | 8/2006 | Surjaatmadia et al. |
| 2006/0196659 A1 | 9/2006 | Jee et al. |
| 2006/0283591 A1 | 12/2006 | Willberg et al. |
| 2008/0093073 A1 | 4/2008 | Bustos et al. |
| 2008/0139416 A1 | 6/2008 | Rimassa et al. |
| 2008/0179057 A1 | 7/2008 | Dawson |
| 2010/0200235 A1 | 8/2010 | Luo et al. |
| 2010/0263866 A1 | 10/2010 | Huang et al. |
| 2011/0088905 A1 | 4/2011 | Kabishcher et al. |
| 2011/0180259 A1 | 7/2011 | Willberg et al. |
| 2012/0024530 A1 | 2/2012 | Todd et al. |
| 2012/0073809 A1 | 3/2012 | Clum et al. |
| 2012/0085536 A1 | 4/2012 | Alboudwarej et al. |
| 2012/0142562 A1 | 6/2012 | Spindler et al. |
| 2012/0267102 A1 | 10/2012 | Huang et al. |
| 2012/0285692 A1 | 11/2012 | Potapenko |
| 2013/0168096 A1 | 7/2013 | Parkhonyuk et al. |
| 2013/0341025 A1 | 12/2013 | Gupta |
| 2013/0341030 A1 | 12/2013 | Brannon et al. |
| 2014/0014338 A1 | 1/2014 | Crews et al. |
| 2014/0138087 A1 | 5/2014 | Gupta |
| 2014/0178325 A1 | 6/2014 | Martinez-Castro et al. |
| 2014/0299318 A1 | 10/2014 | Crews et al. |
| 2014/0318783 A1 | 10/2014 | Martin et al. |
| 2014/0352959 A1 | 12/2014 | Nelson et al. |
| 2015/0041132 A1 | 2/2015 | Nelson et al. |
| 2015/0047838 A1 | 2/2015 | Lecerf et al. |
| 2015/0129214 A1 | 5/2015 | Boney et al. |
| 2015/0233226 A1 | 8/2015 | Holzhauser |
| 2015/0330197 A1 | 11/2015 | Brannon et al. |
| 2017/0051599 A1 | 2/2017 | Bestaoui-Spurr et al. |
| 2017/0159402 A1 | 6/2017 | Nelson et al. |

FOREIGN PATENT DOCUMENTS

| | | |
|---|---|---|
| EP | 0773343 A2 | 5/1997 |
| EP | 1023382 B1 | 8/2006 |
| GB | 2137262 A | 10/1984 |
| GB | 2319796 A | 6/1998 |
| WO | 01/66908 A2 | 9/2001 |
| WO | 0005302 A1 | 2/2002 |
| WO | 02/26656 A1 | 4/2002 |
| WO | 2004018840 A1 | 3/2004 |
| WO | 2004/083600 A1 | 9/2004 |
| WO | 2007032956 A2 | 3/2007 |
| WO | 2011018257 A1 | 2/2011 |

OTHER PUBLICATIONS

Nolte "Application of Fracture Design Based on Pressure Analysis", SPE Production Engineering (1988).*

Li Wei Lo "Interaction of Growing Cracks in Hydraulic Fracturing" Thesis for Master of Science in Mechanical Engineering The University of Texas at Arlington, May 2014. (Year: 2014).*

Chang, F., et al., "Chemical Diversion Techniques Used for Carbonate Matrix Acidizing: An Overview and Case Histories",2007 SPE International Symposium on Oilfield Chemistry; SPE 106444; Feb. 28-Mar. 2, 2007; Houston, Texas.

(56) References Cited

OTHER PUBLICATIONS

Allison, Dave; "Accessfrac Service Diversion Technology"; HO9034; Jan. 30, 2011; 45 pages; Haliburton Energy Services.

Halliburton; "AccessFrac Stimulation Service: Enhanced Proppant Distribution Provides Improved Access to Complex Fracture Networks in Shale Formations"; HO8720; Nov. 2011; 2 pages; Haliburton Production Enhancement.

Drilling Formulas.com reference sheet, "Bottom-hole pressure calculation", pp. 1-2 (Jan. 2010).

Wood, et al., "Ultra-Lightweight Proppant Development Yields Exciting New opportunities in Hydraulic Fracturing Design"; SEP84309; Society of Petroleum Engineers, Inc. (2003).

Gupta, et al., "The History and Success of Liquid CO2 and CO2/N2 Fracturing System"; SPE 40016, Society of Petroleum Engineers, Inc. (1998).

BJ Services Company, "LiteProp 125 Lightweight Proppant," Nov. 21, 2003, USA.

Allison, D., Method to Help Improve Long-Term Production Following Shale Fracture Treatments, H09032; Oct. 31, 2011; Halliburton Energy Services (23 pages).

Halliburton, "Halliburton Introduces AccessFrac Service"; Product Announcement, Oct. 2011, Halliburton (2 pages).

Barree, B., "Pre-Frac Injection Tests in Tight Gas Reservoirs" Presentation, Apr. 17, 2003, Barree & Associates, Lakewood, Colorado (33 pages).

Hannah, R.R., et al., "The Real-Time Calculation of Accurate Bottomhole Fracturing Pressure from Surface Measurements Using Measured Pressures as a Base", SPE 12062, Dallas, TX, Oct. 5-8, 1983 (pp. 1-2).

Chellappah, et al., "A New Outlook on the Ideal Packing Theory for Bridging Solids", Society of Petroleum Engineers, SPE 151636, Feb. 16-17, 2012.

Glasbergen, et al., "Design and Field Testing of Truly Novel Diverting Agent", Society of Petroleum Engineers, SPE 102606, Sep. 24-27, 2006.

Kaageson-Loe, et al., "Particulate-Based Loss-Prevention Material—The secrets of Fracture Sealing REvealed", Society of Petroleum Engineers, SPE 112595, Dec. 2009.

Nitters, et al., "Granular Diverting Agents Selection, Design and Performance", SPE 18884 (1989).

Reddy, et al., "Activator Development for Controlling Degradation Rates of Polymeric Diverting Agents", Society of Petroleum Engineers, SPE 164117, Feb. 2014.

Savari, et al., "Engineered LCM Design Yields Novel Activating Material for Potential Application in Severe Lost Circulation Scenarios", Society of Petroleum Engineers, SPE 164748, Apr. 15-17, 2013.

Savari, et al., "Improved Lost Circulation Treatment Design and Testing Techniques Minimize Formation Damage", SPE 143603, The Netherlands, Jun. 7-10, 2011.

Solares, et al., "Successful Application of Innovative Fiber-Diverting Technology Achieved Effective Diversion in Acid Stimulation Treatments in Saudi Arabia Deep Gas Producers", Society of Petroleum Engineers, SPE 115528, Oct. 20-22, 2008.

Spectra Chemical Catalog, 2013, pp. 1-46.

International Search Report and Written Opinion, PCT Application No. PCT/US2017/042397 dated Oct. 20, 2017.

\* cited by examiner

METHODS OF IMPROVING HYDRAULIC FRACTURE NETWORK

This application is a continuation-in-part application of U.S. patent application Ser. No. 13/927,304, filed on Jun. 26, 2013 which claims the benefit of U.S. patent application Ser. No. 61/664,595, filed on Jun. 26, 2012, both of which are herein incorporated by reference. This application is also a continuation-in-part application of U.S. patent application Ser. No. 14/461,123, filed on Aug. 15, 2014 is which is a continuation-in-part application of U.S. patent application Ser. No. 13/928,006, filed on Jun. 26, 2013, which claims the benefit of U.S. patent application Ser. No. 61/664,640, filed on Jun. 26, 2012, all of which are herein incorporated by reference.

FIELD OF THE INVENTION

The invention relates to a method of hydraulic fracturing and particularly to a method of improving the total surface area of a created or enlarged fracture and/or the complexity of the hydraulic fracture by altering stress conditions in the reservoir.

BACKGROUND OF THE INVENTION

Hydraulic fracturing is a stimulation process for creating high-conductivity communication with a large area of a subterranean formation. The process increases the effective wellbore area within the formation in order that entrapped oil or gas production can be accelerated. The efficiency of the process is often measured by the stimulated reservoir volume (SRV) of the formation.

During hydraulic fracturing, a fracturing fluid is pumped at pressures exceeding the fracture pressure of the targeted reservoir rock in order to create or enlarge fractures within the subterranean formation penetrated by the wellbore. The fluid used to initiate hydraulic fracturing is often referred to as the "pad". In some instances, the pad may contain fine particulates, such as fine mesh sand, for fluid loss control. In other instances, the pad may contain particulates of larger grain in order to abrade perforations or near-wellbore tortuosity.

Once the fracture is initiated, subsequent stages of fluid containing chemical agents, as well as proppants, may be pumped into the created fracture. The fracture generally continues to grow during pumping and the proppants remain in the fracture in the form of a permeable "pack" that serves to "prop" the fracture open. Once the treatment is completed, the fracture closes onto the proppants. Increasing the fracturing fluid pressure ultimately causes an increase in the leak-off rate of the fluid through the faces of fractures which improves the ability of the proppant to pack within the fracture. Once the treatment is completed, the fracture closes onto the proppants. The proppants maintain the fracture open, providing a highly conductive pathway for hydrocarbons and/or other formation fluids to flow into the wellbore.

The treatment design of a hydraulic fracturing operation for a conventional reservoir generally requires the fracturing fluid to reach maximum viscosity as it enters the fracture. The viscosity of the fluid affects fracture length and width.

The viscosity of most fracturing fluids may be attributable to the presence of a viscosifying agent, such as a viscoelastic surfactant or a viscosifying polymer. An important attribute of any fracturing fluid is its ability to exhibit viscosity reduction after injection. Low viscosity fluids known as slickwater have also been used in the stimulation of low permeability formations, including tight gas shale reservoirs. Such reservoirs often exhibit a complex natural fracture network. Slickwater fluids typically do not contain a viscoelastic surfactant or viscosifying polymer but do contain a sufficient amount of a friction reducing agent to minimize tubular friction pressures. Such fluids, generally, have viscosities only slightly higher than unadulterated fresh water or brine. The presence of the friction reduction agent in slickwater does not typically increase the viscosity of the fluid by more than 1 to 2 centipoise (cP).

To effectively access tight formations, wells are often drilled horizontally and then subjected to one or more fracture treatments to stimulate production. Fractures propagated with low viscosity fluids exhibit smaller fracture widths than those propagated with higher viscosity fluids. In addition, low viscosity fluids facilitate increased fracture complexity in the reservoir during stimulation. This often results in the development of greater created fracture area from which hydrocarbons may flow into higher conductive fracture pathways. Further, such fluids introduce less residual damage into the formation in light of the absence of viscosifying polymer in the fluid.

In some shale formations, an excessively long primary fracture often results perpendicular to the minimum stress orientation. Typically, pumping of additional fracturing fluid into the wellbore simply extends the planar or primary fracture. In most instances, primary fractures dominate and secondary fractures are limited. Fracturing treatments which create predominately long planar fractures are characterized by a low contacted fracture face surface area, i.e., low SRV. Production of hydrocarbons from the fracturing network created by such treatments is limited by the low SRV.

Lately, slickwater fracturing has been used in the treatment of shale formations. However, the secondary fractures created by the operation are near to the wellbore where the surface area is increased. Slickwater fracturing is generally considered to be inefficient in the opening or creation of complex network of fractures farther away from the wellbore. Thus, while SRV is increased in slickwater fracturing, production is high only initially and then drops rapidly to a lower sustained production since there is little access to hydrocarbons far field from the wellbore.

Like slickwater fracturing, conventional fracturing operations typically render an undesirably lengthy primary fracture. While a greater number of secondary fractures may be created farther from the wellbore using viscous fluids versus slickwater, fluid inefficiency, principally exhibited by a reduced number of secondary fractures generated near the wellbore, is common in conventional hydraulic fracturing operations.

Recently, attention has been directed to alternatives for increasing the productivity of hydrocarbons far field from the wellbore as well as near wellbore. Particular attention has been focused on increasing the productivity of low permeability formations, including shale. Methods have been especially tailored to the stimulation of discrete intervals along the horizontal wellbore resulting in perforation clusters. While the SRV of the formation is increased by such methods, potentially productive reservoir areas between the clusters are often not stimulated. This decreases the efficiency of the stimulation operation. Methods of increasing the SRV by increasing the distribution of the area subjected to fracturing have therefore been sought.

SUMMARY OF THE INVENTION

The complexity of a fracture network may be enhanced during a hydraulic fracturing operation by monitoring operational parameters of the fracturing job and altering stress conditions in the well during the operation. In addition, the total surface area of the created fracture may be increased by such operations. The method provides an increase to the stimulated reservoir volume (SRV).

One or more operational parameters may be monitored. The common operational parameters which are monitored are the injection rate of the fluid, the density of the fluid and the bottomhole pressure of the well.

One or more operational parameters are assessed before a fluid stage is pumped and after the fluid stage is pumped. Stress conditions within the well may then be altered based on the difference between the monitored reading of the operational parameter after pumping of the fluid stage and a pre-determined target of the operational parameter. Thus, subsequent steps in the hydraulic fracturing operation are determined by the responses observed from monitoring one or more operational parameter(s).

In one embodiment, the operational parameter is monitored after the initial fracturing fluid or pad fluid is pumped into the formation which enlarges or creates initial fracture.

In another embodiment, the operational parameter may be monitored after any fluid stage which is pumped into the formation after the initial fracturing fluid or pad fluid.

In another embodiment, the operational parameter may be monitored during each fluid stage which is pumped into the formation.

When the operational parameter being monitored is different from the targeted operational parameter, the flow of fluid entering the formation may be diverted.

In one embodiment, the flow of fluid from a highly conductive primary fracture or fractures to lower conductive secondary fractures may be diverted after the operational parameter has been monitored.

In an embodiment, the flow of fluid into the formation may be diverted by changing the rate of injection of the fluid which is pumped into the formation after the operational parameter is monitored.

In another embodiment, the flow of fluid may be diverted by pumping into the formation, after the monitored stage is pumped, a diversion fluid which contains a chemical diverting agent.

In an embodiment, the chemical diverter used in the method described herein may be a compound of the formula:

(III)

or an anhydride thereof
wherein:
$R^1$ is —COO—$(R^5O)_y$—$R^4$ or —H;
$R^2$ and $R^3$ are selected from the group consisting of —H and —COO—$(R^5O)_y$—$R^4$; provided both $R^2$ and $R^3$ are —COO—$(R^5O)_y$—$R^4$ when $R^1$ is —H and further provided only one of $R^2$ or $R^3$ is —COO—$(R^5O)_y$—$R^4$ when $R^1$ is —COO—$(R^5O)_y$—$R^4$;
$R^4$ is —H or a $C_1$-$C_6$ alkyl group;
$R^5$ is a $C_1$-$C_6$ alkylene group; and
each y is 0 to 5.

In a preferred embodiment, the chemical diverter is phthalic anhydride or terephthalic anhydride.

In another embodiment, the chemical diverter comprises a mixture of particulates of one or compounds of formula (III) and one or more aliphatic polyesters having the general formula of repeating units:

(I)

where n is an integer between 75 and 10,000 and R is selected from the group consisting of hydrogen, alkyl, aryl, alkylaryl, acetyl, heteroatoms, and mixtures thereof.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

Illustrative embodiments of the invention are described below as they might be employed in the operation and treatment of oilfield applications. In the interest of clarity, not all features of an actual implementation are described in this specification. It will of course be appreciated that in the development of any such actual embodiment, numerous implementation and/or specific decisions must be made to achieve the specific goals of the operator, which will vary from one implementation to another. Moreover, it will be appreciated that such a development effort might be complex and time-consuming, but may nevertheless be a routine undertaking for those of ordinary skill in the art having the benefit of this disclosure. Further aspects and advantages of the various embodiments of the invention will become apparent from consideration of the following description.

Steps of the hydraulic fracturing methods described herein are premised on results obtained from monitoring of one or more operational parameters during treatment of the well. The methods may be used to extend fractures or create a multiple network of fractures. As such, the methods may be used to enhance the complexity of a fracture network within a subterranean formation and to enhance production of hydrocarbons from the formation.

In the methods described herein, one or more operational parameters of a hydraulic fracturing operation are monitored after completion of a fluid pumping stage. In particular, the operational parameters are compared to targeted parameters pre-determined by the operator. Based on the comparison, stress conditions in the well may be altered before introduction of a successive fluid stage into the formation.

The term "successive fluid pumping stage" as used herein refers to the fluid pumping stage in a hydraulic fracturing operation which precedes another fluid pumping stage. The fluid pumping stage which immediately precedes the successive fluid pumping stage is referred to as the "penultimate fluid pumping stage". Since the methods described herein may be a continuous operation or have repetitive steps, a successive fluid pumping stage may be between two penultimate fluid pumping stages. For example, a first successive fluid pumping stage may follow a first penultimate fluid pumping stage. When referring to a "second successive fluid pumping stage", the first successive fluid pumping stage is the second penultimate fluid pumping stage and so on. A successive fluid pumping stage may be pumped into the wellbore following a period of time for the fluid of the penultimate fluid pumping stage to be diverted into the fracture created or enlarged by the penultimate fluid pumping stage.

Stress within the well may be determined by monitoring one or more operational parameters. Changes in one or more of the operational parameters are indications to the operator that fracture complexity and/or fracture geometry has changed and that Stimulated Reservoir Volume (SRV) has increased. For instance, stress noted within the formation may be indicative as to propagation of the fracture. The method of assessing stress within the well may include real-time modeling of the created fracture network using a simulator, such as MShale.

Thus, observance of trends and responses of operational parameters resulting from a penultimate fluid pumping stage may be used to control and dictate conditions of successive fluid pumping stage.

For instance, variances between one or more pre-determined operational parameters with the operational parameter after a second successive fluid pumping stage may indicate to the operator whether fractures have been created or whether fluid has been lost during the second penultimate fluid pumping stage to intercepting fractures.

Based upon the change in one or more of the operational parameters, stress within the reservoir may be altered. For instance, where propagation is insufficient as determined by the operator after a fluid pumping stage, the operator may cause an alteration of the reservoir stress field. The methods defined herein may thus be used to increase the complexity of the fractures by artificially adding a resistance in the fracture such that new fracture paths are opened that would otherwise not be able to be created or enlarged. Thus, fracture complexity may be increased as the differential stress or propagation pressure increases. This may occur without a sustained increase in fracturing pressure.

In a preferred embodiment, one or more of the following operational parameters are monitored during the fracturing operation: the rate of injection of the fluid, the bottomhole pressure of the well (measured as Net Pressure) or the density of the fluid pumped into the formation. The monitoring of such operational parameter(s) may be used to create a network of fractures at near-wellbore as well as far-wellbore locations by altering stress conditions within the reservoir.

The injection rate of the fluid is defined as the maximum rate of injection that the fluid may be pumped into the formation beyond which the fluid is no longer capable of fracturing the formation (at a given pressure). The maximum rate of injection is dependent on numerous constraints including the type of formation being fractured, the width of the fracture, the pressure which the fluid is pumped, permeability of the formation, etc. The maximum rate of injection is pre-determined by the operator. Changes in Net Pressure are indications of change in fracture complexity and/or change in fracture geometry thus producing greater Stimulated Reservoir Volume (SRV). The Net Pressure that is observed during a hydraulic fracturing treatment is the difference between the fluid pressure in the fracture and the closure pressure (CP) of the formation.

Fluid pressure in the fracture=Bottom Hole Treating Pressure (BHTP).

BHTP can be calculated from: Surface Treating Pressure (STP)+Hydrostatic Head (HH)−Total Delta Friction Pressures ($\Delta p_{friction}$=pipe friction+perforation friction+tortuosity).

Determination of closure pressure, pipe friction, perforation friction, and presence of tortuosity is critical. A diagnostic treatment using a step down rate and observance of pressure decline should be conducted if the formation can sustain a pumping shut down without limiting the desired injection rate upon restarting the injection to obtain these necessary parameters. The bottomhole pressure (also known as the measured or calculated bottomhole pumping pressure or measured or calculated bottomhole treating pressure) (BHP) is a measurement or calculation of the fluid pressure in a fracture. It is needed to determine the Net Pressure defined as:

$$P_{net} = STP + HH - P_{fric} - CP$$

Although many conventional fracture treatments result in bi-wing fractures, there are naturally fractured formations that provide the geomechanical conditions that enable hydraulically induced discrete fractures to be initiated and propagate in multiple planes as indicated by microseismic mapping. The dominant or primary fractures propagate in the x-z plane perpendicular to the minimum horizontal stress, $\sigma 3$. The y-z and x-y plane fractures propagate perpendicular to the $\sigma 2$ and $\sigma 1$, stresses, respectively. The discrete fractures created in the x-z and y-z planes are vertical, while the induced fractures created in the x-y plane are horizontal. The microseismic data collected during a fracture treatment can be a very useful diagnostic tool to calibrate the fracture model by inferring DFN areal extent, fracture height and half-length and fracture plan orientation. Integrating minifrac analysis, hydraulic fracturing and microseismic technologies with the production response for multiple transverse vertical fractures provides a methodology to improve the stimulation program for enhanced gas production.

Programs or models for modeling or predicting BHP are known in the art. Examples of suitable models include, but are not limited to, "MACID" employed by Baker Hughes Incorporated and available from Meyer and Associates of Natrona Heights, Pa.; "FRACPRO" from Resources Engineering Services; and "FRACPRO PT", available from Pinnacle Technology. BHP may further be calculated based on formation characteristics. See, for instance, Hannah et al, "Real-time Calculation of Accurate Bottomhole Fracturing Pressure From Surface Measurements Using Measured Pressures as a Base", SPE 12062 (1983); Jacot et al, "Technology Integration—A Methodology to Enhance Production and Maximize Economics in Horizontal Marcellus Shale Wells", SPE 135262 (2010); and Yeager et al, "Injection/Fall-off Testing in the Marcellus Shale: Using Reservoir Knowledge to Improve Operational Efficiency", SPE 139067 (2010).

The objective is therefore to observe changes in one or more of the operational parameters and alter the operational parameter(s) response by using diversion. The value of that change will be formation and area specific and can even vary within the same formation within the same lateral. Those differences arise in the varying minimum and maximum stress planes. In some instances, there is very low anisotropy resulting in "net" fracture development. In other areas the anisotropy is very high, and a conventional profile may dominate the fracture complexity.

Since the presence of low to high anisotropy, as well as anisotropy in between low anisotropy and high anisotropy, can often not be ascertained through a mini-frac treatment, net pressure changes are often the key operational parameter used to assess stress conditions. Downward slopes, negative, are indications of height growth while positive slopes of <45° will be indications of height and extension growth depending on slope. Thus, changes in one or more of the operational parameters may be indicative of fracture height and growth. For instance, while small changes in BHP may be due to varying frictional pressures of fluids (and proppants) as the fluid travels through the fracture system, sustained negative downward slopes may be indicative of height growth, positive slopes of less than 45° may be indicative of height and extension growth.

Stress conditions in the well may be altered by diverting fluid flow such that the fluid pumped into the formation will more readily flow into less conductive secondary fractures within the formation. Such diversion limits injectivity in the primary fractures and stress pressures within the formation. As such, fluid flow may be diverted from a highly conductive primary fracture(s) to less conductive secondary fractures. Since conductivity is permeability multiplied by injection geometry, this is synonymous to the statement that fluid flow may be diverted from a high permeability zone to a low permeability zone. Further, since conductivity is a function of the relative resistance to inflow, the reference to a conductive fracture as used herein is considered synonymous to a conductive reservoir area. Alteration of the local stress conditions provides greater complexity to the created fracture network and/or improves the reservoir coverage of the stimulation treatment.

Thus, the methods described herein can be used to extend or increase a fracture profile. In addition, the methods described herein may be used to create a multiple of fractures originating from the original primary fracture wherein each successive stage creates a fracture having an orientation distinct from the directional orientation of the fracture created by the penultimate fracture.

When necessary, the flow of fluid within the formation may be diverted by subjecting the formation to one or more diversion stages.

Fluid flow may be diverted from highly conductive fractures to less conductive fractures by changing the injection rate and viscosity of the fluid into the formation.

Diversion may also occur by introduction of a diverter fluid or slug containing a chemical diverting agent into the formation. This may cause displacement of the diverter slug beyond the near wellbore.

Further, a combination of a diverter fluid or slug may be used with a change in the injection rate and/or viscosity of fluid into the formation in order to effectuate diversion from a highly conductive fracture to a less conductive fracture. The diverter fluid may contain a chemical diverting agent. The diverter fluid may be pumped into the formation at a rate of injection which is different from the rate of injection of a penultimate fluid pumping stage, but rate is necessarily limited to a rate low enough so as not to exceed the predetermined pressure limitations observed with the surface monitoring equipment.

The diversion stage serves to divert fluid flow away from highly conductive fractures and thus promotes a change in fracture orientation. This causes fluid entry and extension into the secondary fractures. For instance, a reduction in injection rate may be used to allow the shear thinning fluid to build sufficient low shear rate viscosity for adequate pressure diversion for the changing fracture orientation created by the secondary fractures. In addition, reduction in injection rate may contribute to the opening and connecting of secondary fractures.

In an embodiment, diversion fluid and/or the change in injection rate of pumped fluid may create at least one secondary fracture in a directional orientation distinct from the directional orientation of the primary fracture. Thus, at some point along the primary fracture the resistance to flow of the viscosity and resultant increased pressure induces the successive stage fluid to be diverted to a new area of the reservoir such that the increase in SRV occurs.

After diversion, the flow of fluid introduced into the low permeability zone of the formation may be impeded. The operational parameter being monitored may then be compared to the pre-determined operational parameter. Subsequent fluid stages may be introduced into the formation and the need for diversionary stages will be premised on the difference between the monitored operational parameter following the subsequent fluid stage with the targeted operational parameter.

After the diverter fluid is pumped or after the injection rate of fluid into the formation is modified, the operational parameter being monitored may then be noted. If the operational parameter is less than the target of the operational parameter, the fluid flow may continue to be diverted in another diversionary step.

The process may be repeated until the SRV desired is obtained or until the complexity of the fracture is attained which maximizes the production of hydrocarbons from the formation.

Thus, by monitoring an operational parameter and observing changes in the operational parameter, stresses within the formation may be altered. The value of any diversionary step will be formation and area specific and differences may be noted in varying minimum and maximum stress planes within the same lateral. For instance, in some instances very low anisotropy will result in net fracture development. In other areas very high anisotropy may dominate the fracture complexity.

In one preferred embodiment, the bottomhole pressure of fluid after pumping a first stage is compared to the targeted pre-determined bottomhole pressure of the well. The first stage may be the stage which enlarges or creates a fracture. Based on the difference in the bottomhole pressure, the flow of fluid from a highly conductive primary fracture to less conductive secondary fractures may be diverted by introducing into the formation a chemical diverter. The bottomhole pressure after the diversion may then be compared to the pre-determined bottomhole pressure. The flow of fluid introduced into the low conductive fracture in the next stage may then be impeded. Subsequent fluid stages may be introduced into the formation and the need for subsequent diversionary stages will be premised on the difference between the bottomhole pressure after a preceding stage and the pre-determined bottomhole pressure.

In another preferred embodiment, the maximum injection rate which a fluid may be pumped after the pumping of a first fluid stage is compared to the targeted injection rate. The first stage may be the stage which enlarges or creates a fracture. Based on the difference in the rates of injection, the flow of fluid from a highly conductive primary fracture to less conductive secondary fractures may be diverted by introducing into the formation a chemical diverter. The maximum rate of injection after the diversion may then be compared to the pre-determined rate of injection. The flow of fluid introduced into the low conductive fracture in the next stage may then be impeded. Subsequent fluid stages may be introduced into the formation and the need for subsequent diversionary stages will be premised on the difference between the maximum rate of injection after a preceding stage and the pre-determined injection rate.

In another preferred embodiment, the density of a fluid stage after pumping a first stage is compared to a targeted density of a fluid stage. Based on the difference in fluid density, the flow of fluid from a highly conductive primary fracture to less conductive secondary fractures may be diverted by the injection rate of the fluid or by introduction of a chemical diverter into the formation. The density of the fluid stage after the diversion may then be compared to the pre-determined fluid density. The flow of fluid introduced into the low conductive fracture in the next stage may then be impeded. Subsequent fluid stages may be introduced into the formation and the need for diversionary stages will be premised on the difference between the fluid stage density after a preceding stage and the pre-determined fluid density.

In an embodiment, the diversion fluid pumped into the formation in response to a monitored operational parameter may contain a chemical diverter (which may be partially, but not fully, dissolved in at in-situ reservoir conditions) in combination with relatively lightweight particulates having an apparent specific gravity less than or equal to 2.45. Preferably, relatively lightweight particulates are neutrally buoyant in the fluid which further contains the chemical diverter.

Chemical diverters, optionally in combination with relatively lightweight particulates, may be used to control fluid loss to natural fractures and may be introduced into productive zones of a formation having various permeabilities. The diverter, optionally in combination with relatively lightweight particulates, is capable of diverting a well treatment fluid from a highly conductive fracture to less conductive fractures within a subterranean formation.

The diverter may be partially, but not fully, dissolvable in fluids at in-situ reservoir conditions. Any portion of the diverter which remains as an undissolved confined particulate, after being pumped into the formation, may function as a proppant. The amount of diverter which is dissolvable at in-situ conditions is typically from about 75% to about 95%. Preferably, the amount of the diverter which is dissolvable in the fluid is about 90%. At such concentrations, a partial monolayer of the diverter may function as proppant. Over time, all of the diverter may eventually dissolve when fracture closure no longer presents a concern to the operator.

The solid particulates typically bridge the flow spaces on the face of the formation and form a filter cake. For instance, when employed in acid fracturing, the particulates are of sufficient size to bridge the flow space (created from the reaction of the injected acid with the reservoir rock) without penetration of the matrix. By being filtered at the face of the formation, a relatively impermeable or low permeability filter cake is created on the face of the formation. The pressure increase through the filter cake also increases the flow resistance and diverts treatment fluid to less permeable zones of the formation.

The size distribution of the particulates should be sufficient to block the penetration of the fluid into the high permeability zone of the formation. The filter cake is more easily formed when at least 60%, more preferably 80%, of the chemical diverter and/or relatively lightweight particulates within the well treatment fluid have a particle size between from about 150 μm to about 2000 μm.

When used in stimulation operations, the particle size of the particulates is such that the particulates may form a bridge on the face of the rock. Alternatively, the particle size of the particulates may be such that they are capable of flowing into the fracture and thereby pack the fracture in order to temporarily reduce the conductivity of at least some of the fractures in the formation.

Relatively lightweight particulates may also serve as proppant in any of the fluid stages introduced into the formation. In addition, conventional proppants, such as bauxite and sand may be used as proppant in any of the fluid stages.

The first stage may consist of pumping into the formation a fluid at a pressure sufficient to either propagate or enlarge a primary fracture. This fluid may be a pad fluid. Fracture conductivity may be improved by the incorporation of a small amount of proppant in the fluid. Typically, the amount of proppant in the pad fluid is between from about 0.12 to about 24, preferably between from about 0.6 to about 9.0, weight percent based on the total weight percent of the fluid.

Following the injection of the pad fluid, a viscous fluid may then be introduced into the wellbore. The viscous fluid typically has a viscosity greater than about 10,000 cP at a shear rate of 0.01 $sec^{-1}$. The diversion stage may be pumped into the formation after the first stage or between any of the successive stages or penultimate stages.

Between any penultimate stage and successive stage, pumping may be stopped and a pad fluid containing a proppant may be pumped into the reservoir to assist in the creation or enlargement of secondary fractures.

In a preferred embodiment, the proppant is a relatively lightweight or substantially neutrally buoyant particulate material or a mixture thereof. Such proppants may be chipped, ground, crushed, or otherwise processed. By "relatively lightweight" it is meant that the proppant has an apparent specific gravity (ASG) that is substantially less than a conventional proppant employed in hydraulic fracturing operations, e.g., sand or having an ASG similar to these materials. Especially preferred are those proppants having an ASG less than or equal to 3.25. Even more preferred are ultra lightweight proppants having an ASG less than or equal to 2.25, more preferably less than or equal to 2.0, even more preferably less than or equal to 1.75, most preferably less than or equal to 1.25 and often less than or equal to 1.05.

The proppant may further be a resin coated ceramic proppant or a synthetic organic particle such as nylon pellets, ceramics. Suitable proppants further include those set forth in U.S. Patent Publication No. 2007/0209795 and U.S. Patent Publication No. 2007/0209794, herein incorporated by reference. The proppant may further be a plastic or a plastic composite such as a thermoplastic or thermoplastic composite or a resin or an aggregate containing a binder.

By "substantially neutrally buoyant", it is meant that the proppant has an ASG close to the ASG of an ungelled or weakly gelled carrier fluid (e.g., ungelled or weakly gelled completion brine, other aqueous-based fluid, or other suitable fluid) to allow pumping and satisfactory placement of the proppant using the selected carrier fluid. For example, urethane resin-coated ground walnut hulls having an ASG of from about 1.25 to about 1.35 may be employed as a substantially neutrally buoyant proppant particulate in completion brine having an ASG of about 1.2. As used herein, a "weakly gelled" carrier fluid is a carrier fluid having minimum sufficient polymer, viscosifier or friction reducer to achieve friction reduction when pumped down hole (e.g., when pumped down tubing, work string, casing, coiled tubing, drill pipe, etc.), and/or may be characterized as having a polymer or viscosifier concentration of from greater than about 0 pounds of polymer per thousand gallons of base fluid to about 10 pounds of polymer per thousand gallons of base fluid, and/or as having a viscosity of from about 1 to about 10 centipoises. An ungelled carrier fluid may be characterized as containing about 0 to <10 pounds of polymer per thousand gallons of base fluid. (If the ungelled carrier fluid is slickwater with a friction reducer, which is typically a polyacrylamide, there is technically 1 to as much as 8 pounds of polymer per thousand gallons of base fluid, but such minute concentrations of polyacrylamide do not impart sufficient viscosity (typically <3 cP) to be of benefit).

Other suitable relatively lightweight proppants are those particulates disclosed in U.S. Pat. Nos. 6,364,018, 6,330,916 and 6,059,034, all of which are herein incorporated by reference. These may be exemplified by ground or crushed shells of nuts (pecan, almond, ivory nut, brazil nut, macadamia nut, etc); ground or crushed seed shells (including fruit pits) of seeds of fruits such as plum, peach, cherry, apricot, etc.; ground or crushed seed shells of other plants such as maize (e.g. corn cobs or corn kernels), etc.; processed wood materials such as those derived from woods such as oak, hickory, walnut, poplar, mahogany, etc. including such woods that have been processed by grinding, chipping, or other form of particalization. Preferred are ground or crushed walnut shell materials coated with a resin to substantially protect and water proof the shell. Such materials may have an ASG of from about 1.25 to about 1.35.

Further, the relatively lightweight particulate for use in the invention may be a selectively configured porous particulate, as set forth, illustrated and defined in U.S. Pat. No. 7,426,961, herein incorporated by reference.

In a preferred embodiment, at least one diversion step in the method described herein consists of pumping into the formation a fluid containing a chemical diverter in combination with non-dissolvable relatively lightweight particulates including those referenced above. The chemical diverting agent may be partially, but not fully, dissolvable at in-situ reservoir conditions. In another preferred embodiment, the diverting stage contains a chemical diverter with a relatively lightweight particulate substantially naturally buoyant in the fluid.

The fluid phase of the treatment fluid containing the particulates is any fluid suitable for transporting the particulate into a well and/or subterranean formation such as water, salt brine and slickwater. Suitable brines including those containing potassium chloride, sodium chloride, cesium chloride, ammonium chloride, calcium chloride, magnesium chloride, sodium bromide, potassium bromide, cesium bromide, calcium bromide, zinc bromide, sodium formate, potassium formate, cesium formate, sodium acetate, and mixtures thereof. The percentage of salt in the water preferably ranges from about 0% to about 60% by weight, based upon the weight of the water.

The fluid of the treatment fluid may be foamed with a liquid hydrocarbon or a gas or liquefied gas such as nitrogen or carbon dioxide.

In addition, the fluid may further be foamed by inclusion of a non-gaseous foaming agent. The non-gaseous foaming agent may be amphoteric, cationic or anionic. Suitable amphoteric foaming agents include alkyl betaines, alkyl sultaines and alkyl carboxylates, such as those disclosed in U.S. Patent Publication No. 2010/0204069, herein incorporated by reference. Suitable anionic foaming agents include alkyl ether sulfates, ethoxylated ether sulfates, phosphate esters, alkyl ether phosphates, ethoxylated alcohol phosphate esters, alkyl sulfates and alpha olefin sulfonates. Suitable cationic foaming agents include alkyl quaternary ammonium salts, alkyl benzyl quaternary ammonium salts and alkyl amido amine quaternary ammonium salts.

The pH of the fluid containing the particulates may further be adjusted when desired. When adjusted, it typically has a value of about 6.5 or more, 7 or more, 8 or more, 9 or more, between 9 and 14, and, most preferably, between 7.5 and 9.5. The pH may be adjusted by any means known in the art, including adding acid or base to the fluid, or bubbling carbon dioxide through the fluid.

The fluid may be gelled or non-gelled. Typically, the fluid is gelled by the inclusion of a viscosifying agent such as a viscosifying polymer or viscoelastic fluid. The fluid may contain a crosslinking agent though a crosslinking agent is not required. Generally, the viscosity of the fluid is greater than or equal to 10 cP at room temperature.

Figure 1:
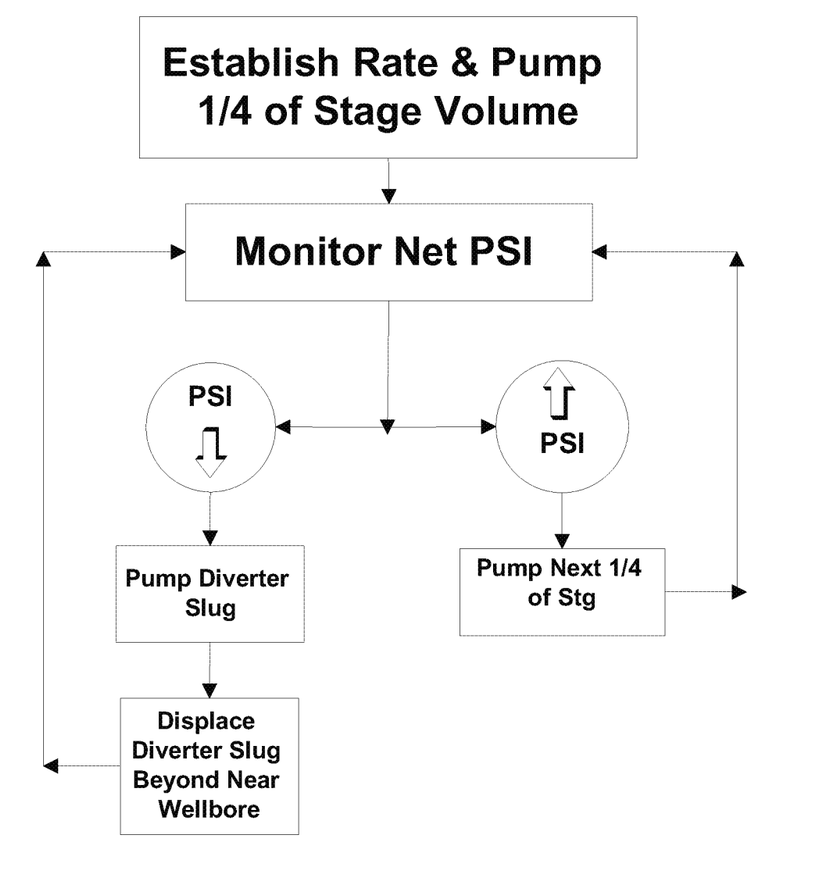
FIG. 1 is a flow diagram of the method of the invention wherein continuous stages are pumped into a subterranean formation to enhance a fracture network.

An illustrative process defined herein is shown in FIG. 1 wherein the operational parameter being monitored is Net Pressure and wherein the fluid volume of each of the stages has been set by an operator; the total volume of the fluid being broken into four or more stages. Each stage may be separated by a period of reduced or suspended pumping for a sufficient duration to allow the staged fluid in the reservoir to flow into a created or enlarged fracture.

The injection rate and the STP are established by the operator. The fracturing operation is initialized by pumping into the formation a first fluid stage comprising a pad fluid or slickwater. The Net Pressure response of the treatment is monitored. A plot of Net Pressure verses time on a log-log scale may be used to identify trends during the treatment. At the end of the fluid pumping stage, the net pressure value and slope is evaluated.

Where the pressure is equal to or greater than the predetermined BHP, then additional fracturing fluid is pumped into the formation as a second or successive stage and it is not necessary to divert the flow of fluid from a high permeability zone to a lower permeability zone. Where the BHP (as measured by net Pressure) is less than the predetermined BHP, then a diverter fluid containing a chemical diverting agent or slug is pumped into the formation. The divert slug is displaced beyond near wellbore. The diverter fluid may be over-displaced beyond the wellbore and into the fracture network. The net pressure response is then observed when the diversion stage is beyond the wellbore and in the fracture network. If the net pressure response is considered to be significant by the operator indicating a change in fracture complexity and/or geometry, then an additional fracturing fluid is pumped into the formation in order to stimulate a larger portion of the reservoir. At the end of pumping stage, net pressure is again evaluated and the possibility of running another diversion stage is evaluated. If the net pressure response is not considered to be significant by the operator, then an additional diversion stage is pumped into the formation and the net pressure response is evaluated when the diversion stage is beyond the wellbore and in the fracture network. The volume and quantity of the successive diversion stage may be the same as the penultimate diversion stage or may be varied based on the pressure response. The injection rate of the pumped fluid may also be changed once the diversion stage is in the fracture system to affect the pressure response. If the net pressure response is too significant in size indicating a bridging of the fracture without a change in fracture complexity and/or geometry, additional pumping may or may not be warranted. For example, if the pressure response is too high the pressure limitations of the tubulars may prevent a continuation of the treatment due to rate and formation injectivity limitations. The running of additional diversion stages may be repeated as necessary until a desired pressure response is achieved and the fracture complexity/geometry is maximized, the well treatment injection is ceased, and the well may then be shut in, flowed back or steps may be undertaken to complete subsequent intervals If the BHP is less than the pre-determined BHP, then a successive stage is pumped into the formation and the process repeated. The process may be continuous and may be repeated multiple times throughout the course of the pumping treatment to attain development of a greater fracture area and greater fracture complexity than that which would be attained in the absence of such measures.

The diversion stage either achieves or directly impacts the monitored BHP so as to artificially increase the differential pressure. This differential pressure may not be obtained without the diverting fluid. The increased pressure differential causes sufficient stress differential to create or enlarge a smaller fracture. The effectiveness of the diversion may then be ascertained by either increasing the volume of a chemical diverter or the size of the chemical diverter. The increase in BHP from the diverting stage limits the fluid volume introduced into the formation which would otherwise be larger volume. Thus, a benefit of the process is that a decreased amount of water may be used to achieve a given degree of stimulation.

In place of the BHP, other parameters, such as fluid density and injection rate of the fluid, may be used as the operational parameter in FIG. 1. With any of these parameters, the operator will determine the targeted level based on the characteristics of the well and formation being treated. Reduction of the injection rate of the fluid further may facilitate the diversion of flow from narrow intersecting fractures especially when accompanied by increases in the treating pressure. An increase in the injection rate of the fluid renders greater propagation in the more primary fractures within the formation.

The diverter of the diversion fluid for use in the invention may be any diverter known in the art. Especially preferred as diverter are those particulates having the structural formula (I):

(III)

or an anhydride thereof
wherein:
$R^1$ is —COO—$(R^5O)_y$—$R^4$ or —H;
$R^2$ and $R^3$ are selected from the group consisting of —H and —COO—$(R^5O)_y$—$R^4$; provided both $R^2$ and $R^3$ are —COO—$(R^5O)_y$—$R^4$ when $R^1$ is —H and further provided only one of $R^2$ or $R^3$ is —COO—$(R^5O)_y$—$R^4$ when $R^1$ is —COO—$(R^5O)_y$—$R^4$;
$R^4$ is —H or a $C_1$-$C_6$ alkyl group;
$R^5$ is a $C_1$-$C_6$ alkylene group; and
each y is 0 to 5.

Alternatively, the particulates may be an anhydride of the compound of structural formula (III).

In a preferred embodiment, $R^1$ of the compound of formula (III) is —H and $R^2$ and $R^3$ are —COO—$(R^5O)_y$—$R^4$. In an especially preferred embodiment, the compound of formula (III) is phthalic acid (wherein y is 0 and $R^4$ is —H). In another preferred embodiment, the compound of formula (III) is phthalic anhydride.

Still in another preferred embodiment, $R^1$ and $R^2$ of the compound of formula (III) are —COO—$(R^5O)_y$—$R^4$ and $R^2$ is —H. In an especially preferred embodiment, the compound of formula (III) is terephthalic acid (wherein y is 0 and $R^4$ is —H). In another preferred embodiment, the compound of formula (III) is terephthalic anhydride.

The diverter may also comprise particulates of one or more compounds of formula (III) and an aliphatic polyester including those having the general formula of repeating units shown below:

(I)

where n is an integer between 75 and 10,000 and R is selected from the group consisting of hydrogen, alkyl (preferably a $C_1$-$C_6$ alkyl), aryl (preferably a $C_6$-$C_{18}$ aryl), alkylaryl (preferably having from about 7 to about 24 carbon atoms), acetyl, heteroatoms (such as oxygen and sulfur) and mixtures thereof. In a preferred embodiment, the weight average molecular weight of the aliphatic polyester is between from about 100,000 to about 200,000.

A preferred aliphatic polyester is poly(lactide). Poly(lactide) is synthesized either from lactic acid by a condensation reaction or more commonly by ring-opening polymerization of cyclic lactide monomer. Since both lactic acid and lactide can achieve the same repeating unit, the general term poly(lactic acid) as used herein refers to formula (I) without any limitation as to how the polymer was made such as from lactides, lactic acid, or oligomers, and without reference to the degree of polymerization.

The lactide monomer exists generally in three different forms: two stereoisomers L- and D-lactide and racemic D,L-lactide (meso-lactide). The oligomers of lactic acid, and oligomers of lactide may be defined by the formula:

(II)

where m is an integer: $2 \leq m \leq 75$. Preferably m is an integer: $2 \leq m \leq 10$. These limits correspond to number average molecular weights below about 5,400 and below about 720, respectively. The chirality of the lactide units provides a means to adjust, inter alia, degradation rates, as well as physical and mechanical properties. Poly(L-lactide), for instance, is a semi-crystalline polymer with a relatively slow hydrolysis rate. Poly(D,L-lactide) may be a more amorphous polymer with a resultant faster hydrolysis rate. The stereoisomers of lactic acid may be used individually or combined.

Additionally, they may be copolymerized with, for example, glycolide or other monomers like ε-caprolactone, 1,5-dioxepan-2-one, trimethylene carbonate, or other suitable monomers to obtain polymers with different properties or degradation times. Additionally, the lactic acid stereoisomers may be modified by blending high and low molecular weight polylactide or by blending polylactide with other polyesters.

As an alternative to the aliphatic polyesters of formula (I), particulates of the compound of formula (III) may be used to enhance the activity of other aliphatic polyesters including star- and hyper-branched aliphatic polyesters polymers as well as other homopolymers, random, block and graft copolymers. Such suitable polymers may be prepared by polycondensation reactions, ring-opening polymerizations, free radical polymerizations, anionic polymerizations, carbocationic polymerizations, and coordinative ring-opening polymerization for, e.g., lactones, and any other suitable process. Specific examples of suitable polymers include polysaccharides such as dextran or cellulose; chitin; chitosan; proteins; orthoesters; poly(glycolide); poly(ε-caprolactone); poly(hydroxybutyrate); poly(anhydrides); aliphatic polycarbonates; poly(orthoesters); poly(amino acids); poly(ethylene oxide); and polyphosphazenes.

The mixture of particulates of aliphatic polyester(s) and the particulates of formula (III) is especially preferred in reservoirs having a bottomhole temperature less than 250° F.

The particulates defined herein may be of any size or shape and the particulates within a given diversionary stage may be of varying size. For instance, the particulates may be substantially spherical, such as being beaded, or pelleted. Further, the particulates may be non-beaded and non-spherical such as an elongated, tapered, egg, tear-drop or oval shape or mixtures thereof. For instance, the particulates may have a shape that is cubic, bar-shaped (as in a hexahedron with a length greater than its width, and a width greater than its thickness), cylindrical, multi-faceted, irregular, or mixtures thereof. In addition, the particulates may have a surface that is substantially roughened or irregular in nature or a surface that is substantially smooth in nature. Moreover, mixtures or blends of particulates having differing, but suitable, shapes for use in the disclosed method further be employed.

The amount of diverter particulates in the diversion fluid may be from about 0.01 to about 30 volume percent (based on the total volume of the fluid) and may be partially dissolvable at in-situ downhole conditions. Typically, the particle size distribution of the particulates is in the range from about 0.1 micron to about 1.0 millimeter.

When particulates of formula (III) are used in combination with particulates of formula (I), the weight ratio of particulates of formula (I) and particulates of formula (III) introduced into the well is typically between from about 90:10 to about 10:90 and more typically between from about 40:60 to about 60:40.

The particulates are particularly effective when placed into wells having bottomhole temperatures between from about 175° F. to about 250° F.

The particulates may be partially, but not fully, dissolved at in-situ reservoir conditions. Typically, the particulates are fully dissolved over time at bottomhole temperatures. In most instances, the particulates are fully dissolved subsequent to completion of the well treatment operation.

When used as a diverter, the fluid containing the particulates may also be pumped directly to the high permeability zone of the well formation. The majority of the diverting fluid will enter into the high permeability or non-damaged zone and form a temporary "plug" or "viscous pill" while the lower permeability zone has little invasion. This temporary "viscous pill" causes a pressure increase and diverts the fluid to a lower permeability portion of the formation. The particulates are capable of being spread deeper into subterranean formations than diverting agents of the prior art.

Once in place, the viscous pill formed from the diverter will have a finite depth of invasion which is related to the pore throat diameter. For a given formation type, the invasion depth is directly proportional to the nominal pore throat diameter of the formation. Since varying depths of invasion occur throughout the formation based upon the varying permeability or damage throughout the treated zone, the ability of the treatment fluid to invade into pore throats is dependent on the difference between pore throat sizing of the damaged and non-damaged formation. Invasion depths will normally be greater in the cleaner or non-damaged portion of the formation (larger pore throats) than in the lower permeability or damaged zones (smaller or partially filled pore throats). With a greater depth of invasion in the cleaner sections of the formation, more of the diverter may be placed in these intervals.

The methods described herein may be used in the fracturing of formations penetrated by horizontal as well as vertical wellbores.

The formation subjected to the treatment of the invention may be a hydrocarbon or a non-hydrocarbon subterranean formation. The high permeability zone of the formation into which the fluid containing the diverter is pumped may be natural fractures. When used with low viscosity fracturing fluids, the particulates of formula (I) are capable of diverting fracturing fluids to extend fractures and increase the stimulated surface area.

The invention has particular applicability to the stimulation of carbonate formations, such as limestone, chalk or dolomite as well as subterranean sandstone or siliceous formations in oil and gas wells, including quartz, clay, shale, silt, chert, zeolite, or a combination thereof.

In another preferred embodiment, the method may be used in the treatment of coal beds having a series of natural fractures, or cleats, for the recovery of natural gases, such as methane, and/or sequestering a fluid which is more strongly adsorbing than methane, such as carbon dioxide and/or hydrogen sulfide.

From the foregoing, it will be observed that numerous variations and modifications may be effected without departing from the true spirit and scope of the novel concepts of the invention.

What is claimed is:

1. A method of creating or enhancing the complexity of a fracture network in a subterranean formation penetrated by a well comprising:
   (a) creating or enlarging a first fracture by pumping into the well a fracturing fluid under pressure;
   (b) comparing the reading of an operational parameter after step (a) with a pre-determined value of the operational parameter, wherein the operational parameter is:
      (i) the injection rate of the fracturing fluid;
      (ii) the density of the fracturing fluid; or
      (iii) the bottomhole pressure in the well;
   (c) determining stress in the well based on the comparison between the reading of the operational parameter after step (a) and the pre-determined value, and then altering stress in the well by flow of a diverting fluid into the well and into the first fracture, the diverting fluid comprising a diverting agent or a slug containing a diverting agent; and (d) pumping another fluid into the well and into a second fracture which is less conductive than the first fracture.

2. The method of claim 1, wherein the diverting fluid of step (c) is introduced into the formation at an injection rate which is different from the injection rate of the fluid pumped in step (a).

3. The method of claim 1, wherein the diverting agent is partially, but not fully, dissolvable at in-situ downhole reservoir conditions.

4. The method of claim 3, wherein the diverting agent not dissolvable at in-situ downhole reservoir conditions props open the created or enlarged primary fracture.

5. The method of claim 1, wherein the diverting agent is fully dissolvable at in-situ downhole reservoir conditions.

6. The method of claim 1, wherein the diverting agent comprises particulates of a compound of the formula:

(III)

or an anhydride thereof
wherein:
$R^1$ is $-COO-(R^5O)_y-R^4$ or $-H$;
$R^2$ and $R^3$ are selected from the group consisting of $-H$ and $-COO-(R^5O)_y-R^4$; provided both $R^2$ or $R^3$ are $-COO-(R^5O)_y-R^4$ when $R^1$ is $-H$ and further provided only one of $R^2$ or $R^3$ is $-COO-(R^5O)_y-R^4$ when $R^1$ is $-COO-(R^5O)_y-R^4$;
$R^4$ is $-H$ or a $C_1$-$C_6$ alkyl group;
$R^5$ is a $C_1$-$C_6$ alkylene group; and
each y is 0 to 5.

7. The method of claim 6, wherein the diverting agent is phthalic anhydride or terephthalic anhydride.

8. The method of claim 6, wherein the diverting agent further comprises particulates of at least one aliphatic polyester having the general formula of repeating units:

(I)

where n is an integer between 75 and 10,000 and R is selected from the group consisting of hydrogen, alkyl, aryl, alkylaryl, acetyl, heteroatoms, and mixtures thereof.

9. The method of claim 1, wherein the subterranean formation is shale.

10. The method of claim 1, wherein a particulate having an apparent specific gravity less than 2.45 is pumped into the formation with the diverting agent.

11. A method of creating or enhancing a fracture network in a subterranean formation penetrated by a well in multiple stages, the method comprising:
(a) monitoring net pressure in the well while pumping into the formation a first fluid stage comprising a pad fluid or slickwater;
(b) pumping fracturing fluid in multiple stages into multiple fractures after step (a) and determining the bottomhole pressure in the well after each stage, wherein each stage is separated by a period of reduced or suspended pumping for a time sufficient for the fluid in said each stage to flow into a fracture of differing directional orientation;
(c) determining stress in the well in between stages by comparing the bottomhole pressure in the well with a pre-determined bottomhole pressure;
(d) after determining stress in the well, altering the stress by injecting a fracturing fluid into the well at a rate different from the injection rate of a previous stage;
(e) repeating steps (c) and (d) until the bottomhole pressure in the well is at least equal to a pre-determined bottomhole pressure.

* * * * *